Patented Nov. 22, 1938

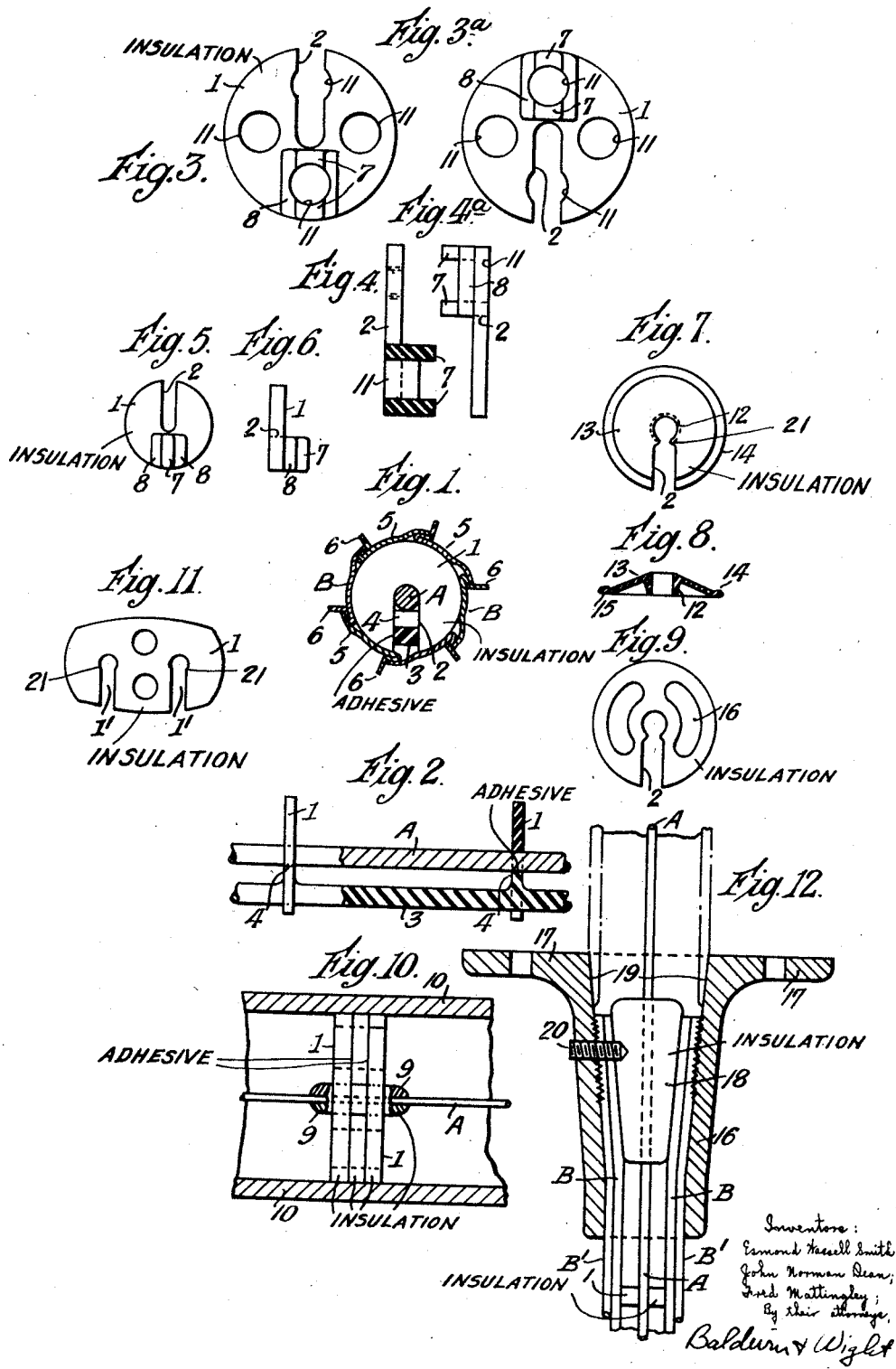

2,137,926

UNITED STATES PATENT OFFICE 2,137,926

HIGH FREQUENCY ELECTRIC CABLE

Esmond Wassell Smith, Chipstead, John Norman Dean, Westerham, and Fred Mattingley, East Sheen, London, England, assignors to Telegraph Construction & Maintenance Company, Limited, London, England Application December 24, 1936, Serial No. 117,662
In Great Britain November 14, 1935

11 Claims. (Cl. 173—265)

This invention relates to high frequency electric cables of the type known as air space cables and comprising two co-axial conductors, the inner being solid or tubular and the outer of tubular structure made up of conductive, preferably copper, wires or tapes, or a continuous sheet or of the type comprising twin conductors enclosed in a common sheath.

With this type of cable the insulation is mainly of a gaseous nature, solid insulation being reduced to a minimum compatible with keeping the conductors separated.

Numerous proposals have been made in coaxial air space cables to separate these conductors and to maintain them in co-axial relation. One proposal, for example, is to use insulating washers placed at intervals on the inner conductor. A second is to wind on to the inner conductor a rib of insulating material in an open spiral. A third is to separate the conductors by hollow thimble shaped insulating pieces.

These prior constructions have not proved satisfactory chiefly from a manufacturing point of view except in cases involving the use of more solid dielectric than is desirable, and the main object of this invention is to provide a construction which will lend itself to simple production while requiring a minimum of solid dielectric. Another object of the invention is to provide an improved construction of composite outer conductor of tubular form suitable for use in these high frequency cables.

According to this invention, we employ as the insulation, a series of washers which are slotted or otherwise cut away to receive the inner conductor or each of the twin conductors, the washers being applied transversely to the conductor or conductors at spaced intervals necessary to support the outer conductor.

In one way of carrying out the invention the washers are held in spaced relationship to each other (along the inner conductor or conductors) by a length or lengths of spacing material.

In another way of carrying out the invention the washers are applied in pairs or groups, the washers of each pair or group being secured to one another to form a single spacing unit. In securing the washers in pairs to the conductor they are applied from different radial directions so that the two slots do not coincide, but are angularly disposed to one another.

The washers may be secured to each other by adhesive or by a lug or rib fitting the slot of the opposite washer. In the latter case the height of the lug may be greater than the thickness of the washer and the lug stepped so that when the two washers are united they are offset.

In a cable where the ratio of the sizes of the inner and outer conductor varies, a standard size of washer may be used and in order to adapt it to the different size of conductor, adaptors consisting of split bushes, which adapted the central holes of the washers to the smaller centre wire or of rim attachments which increase their diameter, may be employed.

According to a further feature of the invention, an air space cable comprises a solid insulation certain sections of which are formed of a thermoplastic material and other sections of a heat resistant material.

The invention is illustrated in the accompanying drawing, in which

Figures 1 and 2 are respectively transverse and longitudinal sectional views of a cable (the outer conductor being omitted in Figure 2) provided with insulation constructed in accordance with one embodiment of the invention.

Figure 3 is an elevation of an alternative form of washer, and Figure 3a is a front elevation of the same kind of washer but in inverted position for mating with the washer shown in Figure 3.

Figure 4 is a view partly in section and partly in side elevation of the washer shown in Figure 3, and Figure 4a is a side elevation of the washer shown in Figure 3a.

Figures 5 and 6 are respectively an elevation and side view of an alternative form of the same washer.

Figures 7 and 8 are an elevation and sectional view of another form of washer, Figure 9 being an elevation of an alternative form of the washer shown in Figure 7.

Figure 10 is a longitudinal sectional view of a cable using washer insulators with adaptors.

Figure 11 is an elevation of a washer for a twin conductor cable.

Figure 12 is a sectional view of a terminal coupling for use with the cable of this invention.

Referring to the drawing, A indicates the central conductor and B the outer conductor. In Figure 1 the outer conductor is shown built up of a plurality of tapes but it will be understood that it may be of tubular form.

The inner and outer conductors are in accordance with this invention held in co-axial relationship by solid insulation comprising a series of washers 1. Each of the washers, which are usually circular, is formed with radial slots 2 of a size frictionally to fit the central conductor A and such that when the washers are placed thereon the conductor will lie substantially centrally of each washer. By making the slots of slightly smaller width than the diameter of the centre conductor and terminating in a hole equal in diameter to that of the conductor the washer will spring into position.

Alternatively the spacers may be slotted in such a manner that a constriction (as shown at 2ᵢ in Figures 7 and 11) is formed at a point in the slot near the central hole, so that they may be sprung on to the conductor and grip it rigidly. Furthermore, the central hole or bushing is preferably slightly smaller than the diameter of the conductor, so that sliding along the conductor is obviated. The conductor may also be slightly reduced, pinched or roughened at the places where the washers are applied.

As shown in Figures 1 and 2 the washers 1 are positioned along the central conductor A at spaced intervals and provide a form of support for the outer conductor B.

After the washers have been positioned on the inner conductor, the slot in each is closed by means such as a strip of insulation material, indicated at 3, the cross section of this strip being such as to fit into the slot 2 and preferably, as shown, it is formed with projections 4 so as substantially completely to fill up the slot, the width of the strip between the washers being only sufficient to give the required mechanical strength.

The thickness of the strip is preferably equal to the diameter of the centre conductor. It will be found that the greater the separation between this strip and the centre conductor the less the dielectric loss, although the strip should preferably not touch the outer conductor.

It will be appreciated that by fixing the strip, to the washers it not only holds them in spaced relationship (from 2 to about 12 inches) but with their planes substantially at right angles to the common axis of the conductors.

It is evident that the washers and spacing material may be made of any insulating material such as Celluloid, mica, etc. affording the necessary mechanical strength, electrical properties, and facilities for joining (e. g. by adhesives) at the projections on the spacing strip.

Or the washers may be moulded from moulding powders from a body belonging to the polymerized acrylic group such as that known as "Resin M" and fixed together with solutions of the same material in alcohol, chloroform, etc.

In certain cases a thermoplastic insulation material such as deresinated gutta percha or "Trolitul" (a brand of polystyrol) may be employed.

In the process of manufacture the centre conductor and this strip are fed forward together through guides, the conductor resting on or engaging the projections of the spacing strip. At each projection a washer is placed over the conductor and strip so that the conductor fits the semi-circular end of the slot in the washer, and the spacing strip lies in the slot. After being placed in position the washer is fixed to the spacing strip (e. g. by an adhesive) so that the centre conductor is provided with a spacing system of sufficient rigidity to hold an outer conductor in substantially fixed relation thereto. At the same time this system may be readily assembled by a machine in which a magazine of washers is positioned immediately over the conductor and spacing strip, and in which a system of levers strikes one washer down from the open end of the magazine on to the conductor and spacing strip at the required intervals in the forward travel of the latter combination.

Instead of spacing single washers at intervals along the conductor, they may be arranged in pairs or groups, the washers of each pair of group being fixed to one another to form a single spacing unit.

In this case the washers are applied to the central conductor from different radial directions so that the two slots are angularly disposed conveniently at 180° to one another.

The washers of each pair or group may be secured to one another by adhesive, or alternatively each washer may be provided with a lug or rib indicated at 7 in Figures 3 and 4, adapted for engagement with the slot of the other washer. Preferably the ribs run radially from the centre hole to the circumference and in the opposite direction to the slot but on the same diameter therewith. In use the two washers are applied from diametrically opposite directions so that the rib of one fits into the slot of the other.

Preferably as shown the height of the ribs is greater than the thickness of the washers and in Figures 3, 3a, 4 and 4a each rib is provided with a shoulder so as to form on each side of the rib proper indicated at 7 a step 8, which when the two washers are assembled engages with the surface of the other washer to hold the two washers spaced apart. Such a construction ensures that the composite spacing unit shall have still less tendency to wobble on the conductor.

Alternatively, the two washers forming a pair may be applied to the conductor with the slots at an angle other than 180°, but in this case they must be applied with a small gap between them and subsequently pressed together and it is not possible to obtain a dovetailed joint.

In Figures 5 and 6 there is illustrated a washer for use in a cable where the distance separating the inner and outer conductors is less than that shown in Figures 3, 3a, 4, and 4a.

It will be appreciated that in an air space cable of the present type it may be desirable to vary the ratio of the size of the inner and outer conductors throughout the length of the cable.

In a cable of the concentric type with an outer conductor whose inner diameter ($2b$) is fixed, there is a particular outer diameter of the inner conductor ($2a$) which gives minimum attenuation. If the outer and inner conductors are of lead and copper respectively a ratio $2b/2a$ of approximately 5.3 gives minimum attenuation. It is desirable in some cases, however, to construct short lengths of cable designed for small capacity, irrespective of attenuation, and in such cases for a fixed outer conductor it is evident that the diameter of the centre conductor must be reduced to the required small value.

In such a cable it is desirable to avoid the necessity of having more than one size of moulding, according to the varying sizes of conductors, and in accordance with a further feature of the invention, we employ a standard size of washer which has been designed for cables of minimum attenuation, and adapt it to the construction of a cable of small capacity by means of auxiliary adaptor pieces. The adaptors used in conjunction with the minimum attenuation washers consist, as is shown in Figure 10, of split bushes 9 which adapt the centre holes of the washers to the smaller centre wire or alternatively of rim attachments (not shown) which increase the diameter of the washer. The bushes 9 may be of a size to extend at their ends beyond the overall width of the spacing washers thereby providing additional support to the thin centre conductor. 10 (see Figure 10) indicates an outer lead sheath. In assembling the adapter system on the centre conductor, the split bushes are preferably first cemented on to the conductor at the required intervals, and the spacing washers then assembled thereon and cemented thereto. In the case where the adaptors are rim attachments, these are cemented to the spacing washers preferably after the latter are assembled on the conductor.

By thus adapting spacing washers designed for cables of minimum attenuation to cables of small capacity, simplification in moulding tools and stocks results, since for a given outer conductor one standard moulding, for example giving the ratio $2b/2a = 5.3$, may be produced and stocked, while for small capacity cables, less expensive adaptor mouldings can be provided for use with the standard moulding.

In order to reduce the amount of insulating material required for the spacing washers, holes 11 (see Figure 3) may be provided therein. It is obviously desirable to reduce the amount of insulating material present in each washer to a minimum so as to avoid undue dielectric losses at the very high frequencies employed.

An alternative method of reducing the amount of dielectric material to a minimum whilst maintaining the necessary mechanical strength and rigidity is to construct the washers on the principle of the disc wheel (see Figures 7, 8 and 9). Each washer may thus consist of a central bushing 12 attached by means of the smallest practical amount of dielectric material indicated at 13 to a strengthened rim portion 14 having one surface 15 flat. The thickness of the central portion 13 of the disc type washer may be approximately 0.01 inch.

Referring to Figure 9 the central portion of the washer, in order to reduce the amount of insulating material present is cut away as indicated at 16 so as to leave a minimum of material, connecting the rim portion to the central bushing.

By using the washers as shown in Figures 7 and 8 it is possible to dispense with the interlocking lugs or ribs and in order to secure them to the conductor, it is sufficient to warm the flat faces 15 of the rims to a degree just sufficient to render them adhesive, when they are pressed into contact. When set they will be found to form a rigid structure.

When the washers are applied in pairs a machine similar to that described above may be employed but having two magazines and a system of levers for striking two washers simultaneously on to the conductor from different directions, the adjacent faces of the washers being in contact and having been previously covered by adhesive material from a pad or pads placed at the open ends of one or both of the magazines.

In another method, grips or holders may be arranged in one or more pairs spaced along a length of the conductor, the spacers being fed to the said holders one by one.

The spacers are then smeared with a suitable cement or (in the case of thermoplastic material) are slightly warmed, and the holders are brought together on to the conductor so as to unite the two halves of the complete spacer. A further motion releases the holders and allows the cable to move forward the requisite distance, so as to bring a fresh length of conductor into position to receive the next application of spacers. The operation is then repeated indefinitely.

In addition the cable may be provided with an outer lead tube either without or with the outer copper conductor. In the former case the lead will function both as a complete electrostatic screen and as the outer conductor and in the latter case it will merely act as an outer screen. This lead tube may or may not be in electrical contact with the outer copper conductor if present.

This lead tube may be drawn into a lead tube of slightly larger diameter than the outer conductor, which is later reduced in size by drawing through dies so that the insulated conductor is a close fit within the tube.

A sheath of a flexible water resisting covering such as the rubber bitumen described in United States Patent No. 1,961,306 may also be provided.

It is to be understood that although the above description applies mainly to the concentric type of cable, the invention is also applicable to the "twin" type in which two identical wires or tubes are symmetrically enclosed within a common sheath or protective covering.

Figure 11 shows a suitable shape of washer provided with two slots 1' extending inwardly from one edge.

As an obvious extension of the invention, multi-conductor cables may be air spaced in a similar way, and thereafter screened or sheathed in any known manner.

While the solid insulation of this invention will withstand the momentary heat of a lead sheath extruded in a continuous process, it will soften unduly if kept stationary in the lead press when this operation is stopped for the purpose of recharging the press with lead. It will also soften under the heat necessarily applied when a wiped joint is made in the lead sheath.

According to a further feature of the invention an air space cable comprises a solid insulation certain sections of which are formed of a thermoplastic material and other sections of a heat resistant material.

Thus the normal insulation may consist of a thermoplastic material such as "Trolitul" while at spaced intervals and extending over short lengths for example a few feet the insulation changes to a heat resisting material such as mica.

An air space cable is thus made intermittently heat-resistant so that the extrusion of the lead over the spacing system may be stopped for recharging the press at any of the heat resisting sections. It is thus possible to produce long lengths of cable without joints in the lead sheath, while retaining the electrical advantages provided by the use of certain thermoplastic dielectrics.

Likewise by constructing the cable for a short distance at its ends of insulation of a heat-resisting character wiped joints may be readily made in the extruded sheath.

At the cable ends an air space cable may be provided with a terminal coupling which, according to a further feature of the invention, comprises a flanged socket, the socket opening being of a size to receive the cable and being tapered in the direction in which the cable enters, and means such as a plug for securing the cable when in position within the socket.

Such an arrangement is shown in Figure 12, in which 16 indicates generally the socket piece provided with an attaching flange 17. 18 is a tapered plug for securing the cable within the socket entrance. The entrance to the socket piece is of a size to fit the cable end and provided with a taper as indicated at 19 in the direction in which the cable enters. The plug 18 which is of dielectric material is provided with a hole or holes for the passage of the centre conductor or conductors.

In use when the socket has been placed in position on the cable end, the outer conductor B with its sheath B' is expanded by driving in the plug 18, into the open end of the cable causing it to fit the tapered part of the socket opening. The wedge may now be secured by a check screw 20.

The cable so terminated may now be attached for example by bolts passing through the flange 17 to a panel or case containing terminal equipment.

It will be evident that the cable armouring, if provided, may be either continued over the tubular part of the flanged coupling and fixed thereto in any convenient manner, or taken into the cable-receiving opening with the outer conductor and locked therewith in the manner above described. Electrical connection is made from the centre conductor direct to the terminal apparatus and from the outer conductor by means of a metal tube, the end of which is tapered to fit the inner (flange) end of the socket opening. Alternatively, connection may be made to a concentric jack, the inner conductor of which makes spring contact with the corresponding conductor in the cable, and the outer conductor of which is a tapered metal tube as above described.

The outer conductor B according to a further feature of the invention is constructed from a plurality of tapes indicated at 5 which are laid around the solid insulation. Each of the tapes 5 is provided with a radial projecting flange 6, the other edge being plain. The flanged edges may be formed by bending the metal back upon itself so as to produce a double thickness of material along that edge, part of the bent back portion being then bent up at right angles to constitute the flange 6, which is thus substantially at right angles to the width of the tape.

In manufacture each tape is pre-shaped on leaving the bobbin in the laying up machine, immediately before being applied to the insulated centre conductor.

In applying the tapes to the solid insulation, their flanged edges are bent over such as by a rolling operation until they lie flat, in engagement with an unflanged edge of an adjacent tape.

A convenient number of these tapes (e. g. 6 to 12, depending on the size of the cable) is laid up with a lay of 12 inches or more round the spacing washers, so that the unshaped edge of one tape fits into the shaped edge of the next. The cable is then immediately passed through a rotating roller die which rolls the projecting edge or flange of each tape flat over the unshaped edge of the adjacent tape. A structure is thus formed, the composite structure and lay of which permit of the cable being coiled, while the flanged or shaped edges of the tapes form reinforcing ribs which present sufficient resistance to lateral pressure to permit of the cable being subsequently handled and laid in position. In order to attain this required resistance to pressure the use of tape of only a few mils thickness is thus permissible. For example, a thickness of 4 to 8 mils is found to be adequate. Such thin tapes are desirable in that they are electrically more efficient than thicker tapes.

What we claim is:—

1. In a high frequency electric cable of the air space insulation type including a conductor, an outer sheath enclosing the conductor and insulation therefor; said insulation comprising a series of washers having edgewise extending slots to receive the conductor and arranged at intervals to support the outer sheath, the washers being mechanically interconnected by means of insulation material interengaging with the slots.

2. In a high frequency electric cable of the air space insulation type including two conductors and insulation therefor; said insulation comprising a series of washers having edgewise extending slots to receive one of the conductors and arranged at intervals to support the other conductor, the washers being mechanically interconnected at least in pairs by means formed of insulation material interengaging with the slots.

3. In a high frequency electric cable of the air space insulation type including a first conductor, an outer sheath conductor and insulation therefor; said insulation comprising a series of washers having slots opening at the edges of the washers to receive the first conductor and arranged at intervals to support the outer sheath conductor, and means formed of insulation material frictionally fit in the slots and adapted to hold the washers against displacement.

4. In a high frequency electric cable of the air space insulation type including two conductors, one of said conductors being an outer sheath enclosing the other conductor and insulation therefor; said insulation comprising a series of washers having slots to receive said other conductor and arranged at intervals to support the outer sheath, and strip insulation material extending through the said slots for holding the washers against displacement.

5. In a high frequency electric cable of the air space insulation type including a conductor, an outer sheath enclosing the conductor, and insulation therefor; said insulation comprising a series of washers which are edgewise slotted to receive the conductor and arranged at intervals to support the outer sheath, and strip insulation material provided with projections at intervals corresponding to the distance separating adjacent washers and entering the slots in the washers.

6. In a high frequency electric cable of the air space insulation type having an outer conducting sheath, an inner conductor and insulation therefor; said insulation comprising a series of washers edgewise slotted and applied transversely at intervals to the inner conductor, a closing means formed of insulation material inserted in the slots, and said washers supporting said outer conducting sheath.

7. In a high frequency electric cable of the air space insulation type having an outer conducting sheath, an inner conductor and insulation therefor; said insulation comprising a series of washers having edgewise extending slots of a size to receive the conductor and applied thereto in groups with the slots at an angle, means consisting of insulation material uniting the washers of each group and said washers supporting said outer sheath.

8. In a high frequency electric cable of the air space insulation type having an outer conducting sheath, an inner conductor, and insulation therefor; said insulation comprising a series of washers having slots of a size to receive the conductor and applied thereto in pairs with the slots in opposite directions, each washer having a rib for engagement with the slot of its companion, and said washers supporting said outer sheath of conducting material.

9. In a high frequency electric signalling cable having a conductor and a sheath and having air space insulation; said insulation comprising a series of insulating washers provided with edgewise opening slots to receive the conductor, the washers being assembled in groups and the washers of each group being positively fastened together to form a spacing unit, the groups of washers being arranged at spaced intervals to support the outer conductor or sheath.

10. In a high frequency electric cable as claimed in claim 9, said washers in each group having ribs constructed to interlock with the slots in adjoining washers.

11. In a high frequency electric cable as claimed in claim 9, each washer comprising a hub and rim portion joined by a disc piece, said hub and rim portions respectively engaging said conductor and said sheath.

ESMOND WASSELL SMITH.
JOHN NORMAN DEAN.
FRED MATTINGLEY.